Patented Apr. 5, 1949

UNITED STATES PATENT OFFICE 2,466,172

METHOD OF PREPARING AN ADHESIVE FROM CEREAL FLOUR

Carl C. Kesler and William L. Hicks, Cedar Rapids, Iowa, assignors to Penick & Ford, Ltd., Incorporated, Cedar Rapids, Iowa, a corporation of Delaware No Drawing. Application May 10, 1945, Serial No. 593,096

6 Claims. (Cl. 106—210)

This invention relates to a method of preparing an adhesive in which the adhesive characteristics are derived from a cereal flour.

An object of the invention is to prepare an adhesive from a cereal flour which possesses a substantially uniform and predetermined viscosity and has desirable characteristics as to tack, cohesiveness, adhesiveness, and viscosity. Still another object is to prepare a neutral flour adhesive in which the spreadability in the application, penetration, rate of drying, and the resultant adhesive bond may be readily controlled. Yet another object is to prepare a flour adhesive by a method of treatment in which the starch of the flour is gelatinized but remains substantially unmodified and in which the protein of the flour is swollen and partially hydrolyzed. Another object is to provide a method of treating flour wherein the enzymes thereof are rendered substantially inactive and a substantially neutral or acid adhesive is ultimately produced. Still another object is to provide a method for preparing adhesives which are valuable for incorporation with resins. A further object is to provide a flour adhesive containing a minimum quantity of reducing sugars.

Another purpose or object of the invention is to inactivate or destroy the naturally-occurring enzymes present in the cereal flour and which vary in quantity and type within the flour in order to produce a cereal flour which subsequently may be uniformly modified by chemical treatment or by commercial enzymes. The naturally-occurring enzymes as found in the cereal flours are in general those which produce low molecular weight substances of the reducing sugar type when the starch is modified by these enzymes. This type of enzyme is purposely avoided in the production of commercial enzymes which are used in making industrial adhesives. The commercial enzymes are selected to produce modified starches.

Efforts have heretofore been made to utilize various flours, such as the cereal flours from wheat, rye, etc., in adhesives. In some instances, the flour has been mixed with water to form a paste, and is thus applied as an adhesive. In this type of adhesive, however, when the paste has dried, no adhesive value is obtained from the starch portion of the flour. The only adhesive effect which is obtained is from the protein of the flour.

On the other hand, when flour is cooked so as to gelatinize the starch and to form a paste in which the adhesive characteristics of the starch may be utilized, the product is not satisfactory for many commercial uses. In the gelatinization of the starch, the starch also becomes modified due to enzyme action on the cooked starch, and the extent of modification will vary with the particular flour and the particular sample of the flour which is used. Because of the variations in the modification of the starch and the variations in the quantities of dextrines and sugars which may be present, the viscosity of the cooked paste will also vary substantially. Unless the viscosity can be controlled, it is extremely difficult, if not impossible, as a commercial matter to control the spread of the adhesive, the penetration, the rate of drying, and the resultant adhesive bond. Prior efforts to prepare a cooked flour adhesive have, therefore, not been uniformly satisfactory from the commercial point of view.

The variations in the viscosity of flour adhesives which have been prepared according to the methods heretofore known have been found to be very extreme. For example, two samples of rye flour from two sources of supply may be cooked in a 30% concentration under identical conditions and may be found to vary widely in viscosity. In a particular instance, one sample may have a viscosity of 1,000 centipoises and be very thin, whereas the other may have a viscosity of 5,000 centipoises and be much heavier. This variation in viscosity is apparently due to the modification in the starch of the flour and the modification, in turn, is believed to be due to the action of natural enzymes present in the flour. The action of these natural enzymes present in the flour is a function of many variable factors, such as time, temperature, pH, and the moisture content of the cereal grain. Their production, for example, may be increased in the shock of grain in the field or in the grain prior to milling. For example, the storage of a sample of grain of a high moisture content may accordingly affect the enzyme content of the sample. Conditions under which the enzyme content of the flour may vary are therefore almost impossible to control.

In the present invention, the modification, and therefore the viscosity, of the starch in the course of the gelatinization is carefully controlled and the product is found to have a substantially uniform predetermined viscosity. In addition, the process of the present invention serves to swell and partially hydrolyze the proteins of the flour and thus render the proteins more effective for adhesive action. At the same time, the quantity of reducing sugars in the adhesive product is limited by limiting the modification of the starch. The resultant adhesive product may be mixed with resins to impart improved water resistance to the adhesive by reason of the insolubilizing action of the resin on the starch portion. The so-called reducing sugars, which are formed by the hydrolysis of starch, do not in themselves have any adhesive power and, being water-soluble, tend to interfere with the insolubilizing of the finished adhesive by the resin. This effect is particularly important when the adhesive is to be used with a resin, such as a urea-formaldehyde condensation product.

Broadly, the invention contemplates the preparation of an adhesive by the steps of gelatinizing the starch in the flour without substantially modifying the same, and simultaneously swelling and partially hydrolyzing the protein in the flour. Such a product is extremely valuable for use in combination with resins in forming water-resistant adhesive bonds.

The steps of the treatment include the addition of alkali to the flour prior to the gelatinization of the starch of the flour, the maintaining of the starch of the flour in the ungelatinized state until the enzymes in the flour have been rendered substantially inactive, the cooking of the mixture to gelatinize the starch and swell the protein of the flour, and the neutralizing of the alkali to produce a neutral or acid adhesive.

The invention is applicable to the various types of flour which contain starch, and particularly to the cereal flours, such as wheat flour, rye flour, corn flour, buckwheat flour, barley flour, and oat flour. The invention may also be applied to rice flour.

The flour is mixed in a suitable quantity of water with alkali, which may consist of an alkali metal hydroxide, such as sodium or potassium hydroxide. The quantity of water used should be sufficient to suspend the flour therein. Only a small amount of alkali is necessary.

Preferably, the quantity of alkali which is added is sufficient to bring the pH of the entire mixture to a pH of between 9 and 10, although the pH may vary over rather wide limits while the process still produces effective results. It has been found that the pH is preferably maintained below 10.5. The alkali in the desired quantity should be thoroughly incorporated in the mixture and, if desired, the mixture may be held below gelatinization temperature for a short time in order to assure the inactivation of the bulk of the enzymes present. Some enzymes are rendered inactive by the alkali much more readily than others, but in general substantially all or most of the enzymes are quickly rendered inactive by the alkali treatment.

After the naturally-occurring enzymes have been inactivated by the alkali, the mixture is heated to a suitable temperature to gelatinize the starch and swell the portein of the flour. Preferably, a temperature in the neighborhood of 170° F. to 200° F. is used. The cooking process in itself may correspond to the conventional cooking of starches to gelatinize them.

If it is desired to modify the starch by means of commercial enzymes, the alkali is neutralized prior to reaching the gelatinization point, to a pH suitable for enzyme action; or, if the starch is to be used without modification of its viscosity, it may be first cooked and then a suitable acid may be added to neutralize the alkali present in the mixture. Preferably, a mineral acid, such as a hydrochloric or sulphuric acid, is used for this purpose. The quantity of acid which is added may be sufficient to bring the mixture to a pH of approximately 7, or if the adhesive is to be used with resins, such as urea-formaldehyde resins which are best cured in an acid medium, the pH may be reduced to below 7, for example to between 5 and 6.5, at which pH range in the presence of a catalyst a reasonable working life of the glue is obtained.

As a specific example of the process, 3,600 pounds of white corn dextrin of approximately 30% solubility and 2,400 pounds of rye flour may be added to 11,100 pounds of water in a 2,000 gallon steam jacketed tank. The mixture is agitated until a good dispersion of the dextrin and the flour is obtained. Twenty pounds of sodium hydroxide are then added and dispersed in the flour mixture to produce a pH in the mixture of about 9.3. The mixture is then heated to a temperature between 180° F. and 210° F. to cook and gelatinize the starch. To the cooked mixture, approximately 33 pounds of 28% hydrochloric acid may be added to reduce the pH of the mixture to below 7.0. The resultant adhesive may be mixed with a urea resin to form a cereal flour resin adhesive.

As another example of the invention, 1,000 pounds of wheat flour may be added to 7,000 pounds of water in a 1,000 gallon steam jacketed tank. The flour is stirred until free of lumps. Four pounds of sodium hydroxide are added to produce a pH in the mixture of approximately 9.5. The mixture is then heated to between 180° F. and 200° F. to cook the starch. The resulting cooked starch adhesive may be cooled and sufficient hydrochloric acid added to reduce the pH to below 7.0.

As another example, a controlled-viscosity enzyme-converted cereal flour adhesive can be made. To a 2,000 gallon tank are added 10,000 pounds of water and 5,000 pounds of rye flour. The mixture is agitated until free of lumps and 30 pounds of caustic soda are added to raise the pH to approximately 9.5. The mixture is then heated to a point below where any appreciable swelling of the starch present in the flour occurs, which may be in the order of 130° F. About 45 pounds of hydrochloric acid are added to lower the pH of the mixture to 6.5. After the mixture has been neutralized, approximately 30 pounds of commercial standard-strength starch-hydrolyzing enzyme may be added to the mixture. Heating is then continued slowly to allow for the thinning action of the enzyme and then further heated to approximately 185° F. to 190° F. to completely gelatinize the starch. Upon gelatinization of the starch, the product is ready for use as an adhesive. This adhesive is neutral or slightly acid. If desired, the alkaline adhesive may be formed by adding suitable alkaline material to the product. For example, 350 pounds of borax and 175 pounds of soda ash may be added to the mixture. The resultant product is a tacky uniform alkaline cereal flour adhesive.

It will be understood that various commercial enzymes may be used which convert starch more rapidly or efficiently at pHs other than 6.5. In such cases, the amount of acid added to the entire suspension may be varied to obtain the desired results with the particular enzyme used.

By using commercial starch hydrolyzing enzymes for the modification of the starch, the change in viscosity of the starch is substantially uniform and may be predicted with accuracy. This is in contrast to any modification of the starch in the flour which might occur by reason of naturally-occurring enzymes. In this latter situation, the viscosity change is not uniform or predetermined and, in fact, the effect on the starch may vary with the quantity and type of enzyme present as well as with other variable factors. By destroying the naturally-occurring enzyme with alkali, then neutralizing the mixture, and modifying or hydrolyzing the starch with commercial starch hydrolyzing enzyme, the starch is modified and the viscosity decreased without forming any substantial proportion of reducing sugars in the mixture. In other words, commercial starch hydrolyzing enzymes are of a type designed to modify and thin the starch without forming a large proportion of reducing sugars. Accordingly, when a thin or modified starch adhesive is to be formed from a cereal flour, it is desirable that the naturally-occurring enzymes be destroyed or inactivated and the product then treated with commercial starch hydrolyzing enzymes to form the desired modified starch adhesive.

The addition of the alkali prior to the gelatinization of the starch has been found to produce a remarkable difference in the adhesive product which is formed. The following table shows the viscosity and percentage of reducing sugars present in samples which were prepared in accordance with the invention in comparison with a sample in which no alkali and no acid were added. All three samples were cooked to 190° F. under identical conditions. When hydrochloric acid was added, as in the case of two samples, it was added while the starch was cooling or at a temperature of about 180° F., and a sufficient quantity was added to reduce the pH below 7.0. In the case of sample No. 1, no sodium hydroxide and no hydrochloric acid were added. In the case of samples No. 2 and No. 3, the alkali was added prior to the gelatinization of the starch and the acid was added after the gelatinization was complete.

|  | No. 1 | No. 2 | No. 3 | No. 4 |
|---|---|---|---|---|
| Corn Dextrin pts | 105 | 105 | 60 | 60 |
| Rye Flour pts | 39 | 39 | 84 | 84 |
| Water pts | 366 | 366 | 366 | 366 |
| Sodium Hydroxide |  | 0.6 | 0.6 |  |
| Hydrochloric Acid |  | 1.0 | 1.0 |  |
| Viscosity centipoises | 2,000 | 9,000 | 9,000 | 1,800 |
| Reducing Sugars as Maltose per cent | 20.2 | 3.3 | 1.5 | 23 |

The differences in reducing sugars between Examples 1 and 2 and Examples 3 and 4 are even more striking when one realizes that the end products of the enzymes are mixtures, some of which have molecular weights considerably greater than maltose and for that reason the true percentage difference of the figures in the table is not an absolute measure of the benefit that results from the process.

The much lower proportion of reducing sugars present in the treated samples results in such samples being much more readily used with condensation products, such as the urea-formaldehyde resins. The relatively large proportion of reducing sugars present in Example 1 is highly undesirable with such resins.

By means of the invention, the starch is gelatinized without substantial modification thereof, and thus is produced in a uniform and predetermined viscosity. At the same time, the presence of the alkali tends to swell and partially hydrolyze the protein and improve the adhesive action of the protein itself. By reason of the control of the modification of the starch, the quantity of reducing sugars present in the product is also minimized.

Although the invention has been described in connection with specific embodiments, it will be apparent that modifications and changes may be made without departing from the spirit and scope of the invention.

We claim:

1. A method of preparing an adhesive from cereal flour, comprising mixing the cereal flour in water with alkali in an amount less than that required for dispersing the starch in the flour but sufficient to bring the pH to about 9-10, heating the material to about 130° F. to inactivate naturally-occuring enzymes in the flour, lowering the pH to about 5-7, introducing starch hydrolyzing enzymes into the mixture, and raising the temperature to about 170-210° F. to cook the starch.

2. A method of preparing an adhesive from cereal flour, comprising mixing the cereal flour in water with an alkali to bring the pH to about 9-10, heating the material to about 130° F. to inactivate naturally-occurring enzymes in the flour lowering the pH to about 5-7, introducing a starch hydrolyzing enzyme into the mixture, and raising the temperature to about 170-210° F. to cook the starch.

3. A method of preparing an adhesive from cereal flour, comprising cereal flour containing substantially unmodified ungelatinized starch in water with an alkali to bring the pH to about 9-10, heating the material at a temperature about 130° F., lowering the pH to about 5-7, introducing a starch hydrolyzing enzyme into the mixture, and raising the temperature to 170-210° F. to cook the starch.

4. A method of preparing an adhesive from cereal flour, comprising mixing the cereal flour in water with an alkali less in amount than that required for dispersing the starch but sufficient to bring the pH to about 9-10, heating the material at about 130° F. to inactivate the naturally-occurring enzymes in the flour, bringing the temperature to about 170-210° F. to cook the starch, and adjusting the pH of the material within 5-7.

5. A method of preparing an adhesive from cereal flour, comprising mixing the cereal flour in water with an alkali to bring the pH to about 9-10, heating the material at a temperature about 130° F. to inactivate the naturally-occurring enzymes in the flour, raising the temperature to about 170-210° F. to cook the starch, and adjusting the pH of the material within 5-7.

6. A method of preparing an adhesive from cereal flour, comprising mixing the cereal flour containing substantially unmodified ungelatinized starch in water with an alkali to bring the pH to about 9-10, heating the material for a short time at a temperature of about 130° F. in the presence of the alkali to inactivate naturally-occurring enzymes in the flour, raising the temperature to about 170-210° F. to cook the starch, and adjusting the pH of the material to between 5 and 6.5.

CARL C. KESLER.
WILLIAM L. HICKS.

REFERENCES CITED

The following references are of record in the file of this patent:

UNITED STATES PATENTS

| Number | Name | Date |
|---|---|---|
| 1,257,307 | Bloede | Feb. 26, 1918 |
| 1,380,568 | Laflamme | June 7, 1921 |